US008948583B2

(12) United States Patent
Furuyama

(10) Patent No.: US 8,948,583 B2
(45) Date of Patent: Feb. 3, 2015

(54) INFORMATION PROCESSING APPARATUS, METHOD OF CONTROLLING THE SAME AND CAMERA

(75) Inventor: Hiroaki Furuyama, Tachikawa (JP)

(73) Assignee: Canon Kabushiki Kaisha, Tokyo (JP)

(*) Notice: Subject to any disclaimer, the term of this patent is extended or adjusted under 35 U.S.C. 154(b) by 8 days.

(21) Appl. No.: 12/960,950

(22) Filed: Dec. 6, 2010

(65) Prior Publication Data
US 2011/0150443 A1 Jun. 23, 2011

(30) Foreign Application Priority Data

Dec. 18, 2009 (JP) ................................ 2009-288419

(51) Int. Cl.
G03B 17/00 (2006.01)
G05B 11/01 (2006.01)
H04N 5/232 (2006.01)
H04N 5/77 (2006.01)

(52) U.S. Cl.
CPC ........... H04N 5/232 (2013.01); H04N 5/23216 (2013.01); H04N 5/23293 (2013.01); H04N 5/772 (2013.01)
USPC .............................................. 396/55; 700/14

(58) Field of Classification Search
USPC ............... 396/50, 52, 281–283, 286, 287, 55; 700/14; 200/43.01, 43.18, 50.37; 715/772
See application file for complete search history.

(56) References Cited

U.S. PATENT DOCUMENTS 7,579,565 B2 * 8/2009 Al Dosari ..................... 200/330
2004/0210161 A1 * 10/2004 Burdorff et al. .............. 600/566
2005/0134882 A1 * 6/2005 Horii et al. ................... 358/1.11
2006/0213754 A1 * 9/2006 Jarrett et al. ............... 200/43.01
2007/0276522 A9 11/2007 Moon et al.
2008/0082145 A1 * 4/2008 Skwarek et al. ................ 607/60
2008/0295015 A1 * 11/2008 Liu et al. ....................... 715/772

(Continued)

FOREIGN PATENT DOCUMENTS

CN 101021667 A 8/2007
CN 101179785 A 5/2008
JP 11-175099 7/1999

(Continued)

OTHER PUBLICATIONS

JP2000-132316 English Translation.*

(Continued)

Primary Examiner — Clayton E LaBalle
Assistant Examiner — Minh Phan
(74) Attorney, Agent, or Firm — Cowan, Liebowitz & Latman, P.C.

(57) ABSTRACT

This invention provides an information processing apparatus for allowing a user to perform operation without any confusion concerning a device which implements a plurality of functions for one operation member in accordance with operation methods for the operation member. A system controller performs control to execute a predetermined function in response to the start of operation on an operation member and terminate execution of the predetermined function in response to the end of the operation. A timer function unit measures the time from the start of operation on the operation member. When a given operation finishes before the time measured by the timer function unit exceeds a predetermined time after the start of the operation, a notification about the operation method for the operation member is output.

17 Claims, 7 Drawing Sheets

(56) References Cited

U.S. PATENT DOCUMENTS

| | | | | |
|---|---|---|---|---|
| 2008/0310833 | A1* | 12/2008 | Tanaka | 396/354 |
| 2009/0295975 | A1* | 12/2009 | Takahashi et al. | 348/333.01 |

FOREIGN PATENT DOCUMENTS

| JP | 2000-132316 A | 5/2000 |
|---|---|---|
| JP | 2003-316212 A | 11/2003 |
| JP | 2008-028655 A | 2/2008 |
| JP | 2008-311917 A | 12/2008 |

OTHER PUBLICATIONS

The above references were cited in a Sep. 5, 2012 Chinese Office Action, which is enclosed with an English Translation, that issued in Chinese Patent Application No. 201010609314.3.

* cited by examiner

INFORMATION PROCESSING APPARATUS, METHOD OF CONTROLLING THE SAME AND CAMERA

BACKGROUND OF THE INVENTION

1. Field of the Invention

The present invention relates to an information processing apparatus that controls a device in accordance with operation on an operation member, a method of controlling the apparatus, and a camera.

2. Description of the Related Art

It has often been the case that a plurality of types of functions are implemented in accordance with the operation times of one operation member. For example, a music player is controlled such that when the user presses a predetermined button for one sec or less, the player skips to the next tune, whereas when the user presses the button for one sec or more, the player performs fast forward playback during the press of the button (see, for example, Japanese Patent Laid-Open No. 11-175099).

According to the technique disclosed in Japanese Patent Laid-Open No. 11-175099, however, against the will to perform fast forward playback, since the user presses the button for a time shorter than required, the player skips to the next tune. This confuses the user because he/she does not know what has happened. This problem can occur in cameras and the like as well as music players like that disclosed in Japanese Patent Laid-Open No. 11-175099.

SUMMARY OF THE INVENTION

The present invention has been made in consideration of the above problem to allow the user to operate, without any confusion, a device configured to implement a plurality of functions in accordance with operation methods for one operation member.

In one aspect of the present invention, an information processing apparatus comprises a control unit configured to perform control to execute a predetermined function in response to a start of operation on an operation member and terminate execution of the predetermined function in response to an end of the operation, a time measuring unit configured to measure a time from a start of operation on the operation member, and an output unit configured to output a notification about an operation method for the operation member when the operation ends before the time measured by the time measuring unit exceeds a predetermined time after the operation starts.

Further features of the present invention will become apparent from the following description of exemplary embodiments (with reference to the attached drawings).

DESCRIPTION OF THE EMBODIMENTS

The preferred embodiments of the present invention will be described in detail below with reference to the accompanying drawings. Note that the present invention is not limited to the following embodiments, and they are merely concrete examples advantageous to the execution of the invention. All the combinations of the features described in the following embodiments are not necessarily essential as means for solving the problem of the present invention.

<First Embodiment>

The first embodiment will exemplify a case in which an information processing apparatus of the present invention is applied to a digital video camera. This embodiment will exemplify a case in which the information processing apparatus of the present invention performs control for the active image stabilization function of a digital video camera. In this case, "the active image stabilization function" is a function of temporarily enhancing image stabilization processing in accordance with a predetermined operation.

Figure 1:
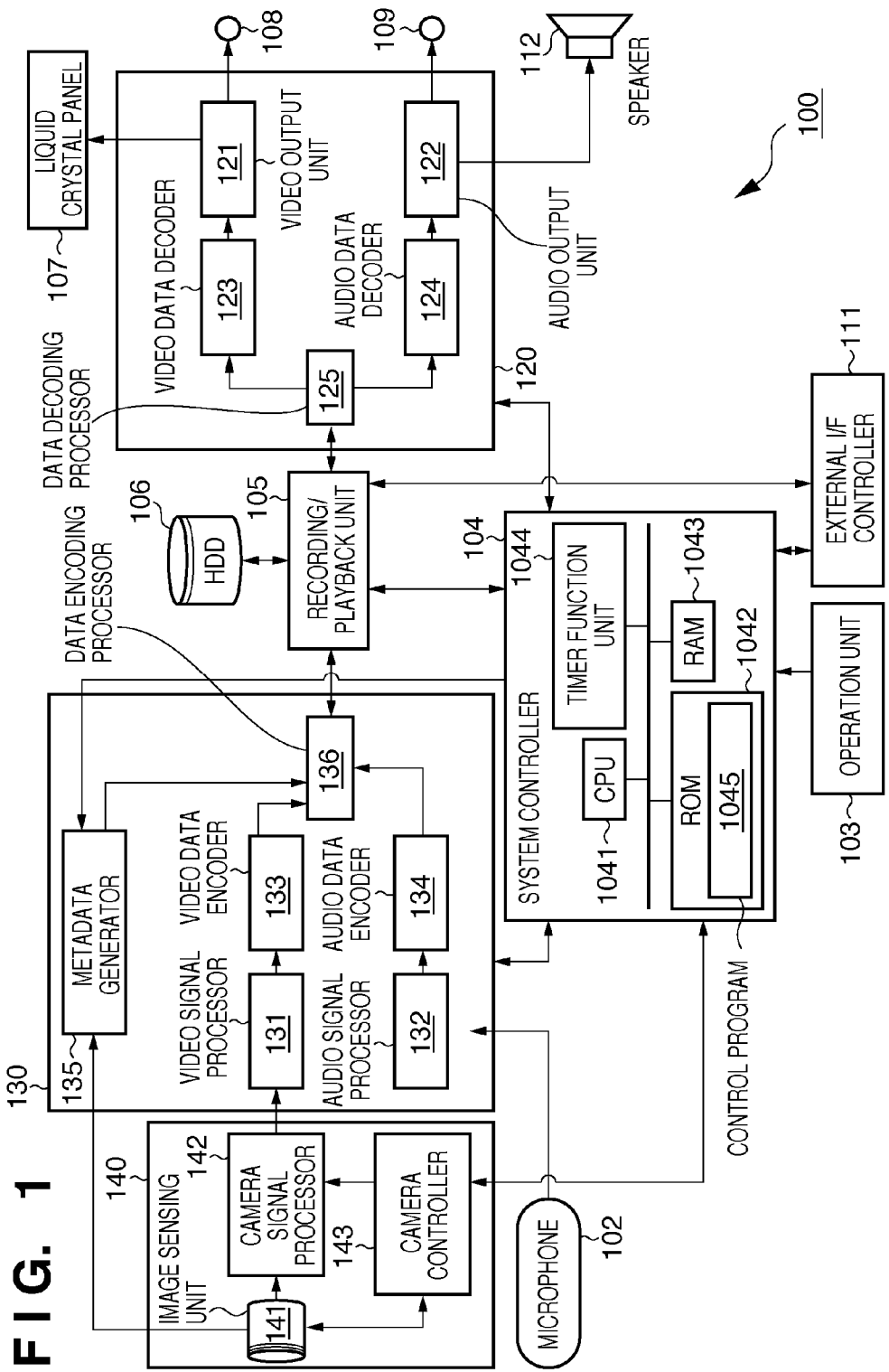
FIG. 1 is a block diagram showing an example of the arrangement of a digital video camera according to an embodiment.

FIG. 1 is a block diagram showing an example of the arrangement of a digital video camera 100 according to this embodiment. The digital video camera 100 includes a camera block 140, a microphone 102, an operation unit 103, a system controller 104, a recording/playback unit 105, a hard disk drive (to be referred to as an "HDD" hereinafter) 106, a liquid crystal panel 107, a video output terminal 108, an audio output terminal 109, an external I/F (interface) controller 111, a speaker 112, a recording processing block 130, and a playback processing block 120.

The camera block 140 includes an image sensing unit 141, a camera signal processor 142, and a camera controller 143. The image sensing unit 141 includes an optical system lens, an image sensing element such as a CCD, an autofocus mechanism, a zoom mechanism, and an image stabilization mechanism (none of which are shown). With this arrangement, the image sensing unit 141 adjusts a focal point, an amount of light, and the like for a field, converts an optical image at the depth of field at which image formation was performed through a lens into a video signal, and transmits the signal to the camera signal processor 142 in accordance with an instruction from the camera controller 143. The camera signal processor 142 performs predetermined signal processing for the video signal in accordance with an instruction from the camera controller 143, and transmits the resultant signal to a video signal processor 131. The operation unit 103 includes operation members such as various kinds of buttons and dials (an AF ON/OFF dial, AE auto/lock dial, program AE dial, zoom dial, active image stabilization dial, and the like) associated with the camera system, and transmits instructions from the operator to the camera controller 143 via the system controller 104. The camera controller 143 includes a microcomputer and controls the overall camera system in accordance with instructions from the system controller 104 and the operation unit 103.

The recording processing block 130 includes the video signal processor 131, an audio signal processor 132, a video data encoder 133, an audio data encoder 134, a metadata generator 135, and a data encoding processor 136. The playback processing block 120 includes a video output unit 121, an audio output unit 122, a video data decoder 123, an audio data decoder 124, and a data decoding processor 125.

The operation unit 103 is a man-machine interface to allow the user to set various settings and issue instructions to the digital video camera 100. The operation unit 103 includes, in addition to the buttons and dials associated with the camera system described above, operation members such as a power switch, an operation mode switch, a start/stop button, various kinds of playback-related buttons such as a playback button, a menu button, up, down, left, and right buttons, and a decision button. The operation unit 103 includes an active image stabilization button 501 (FIG. 5) to receive an instruction to execute "the active image stabilization function" of temporarily enhancing the image stabilization function at the time of image capturing.

The system controller 104 is formed by a microcomputer including a CPU 1041, a ROM 1042, and a RAM 1043. The system controller 104 includes a timer function unit 1044 to measure the time. In addition to this unit, the system controller 104 includes a logic such as a memory controller to control the ROM 1042 and the RAM 1043, a time measuring unit, and an I/O port, and comprehensively controls the digital video camera 100. The ROM 1042 stores a control program 1045. The CPU 1041 expands this program in the RAM 1043 and executes the program, thereby implementing various kinds of control.

The external I/F controller 111 is a digital interface such as a USB. The external I/F controller 111 connects the digital video camera 100 to a peripheral device host such as a personal computer or DVD writer, and transfers a video file in accordance with a request from the peripheral device host in response to an instruction from the system controller 104.

(Recording Mode)

The operation of the digital video camera 100 according to this embodiment will be described below. The operation in the recording mode will be described first. When the user presses the start/stop button upon selecting the recording mode with the operation mode switch of the operation unit 103, the system controller 104 detects this and starts recording while controlling the respective units of the recording processing block 130.

The recording processing block 130 encodes the video data obtained by the camera block 140 and outputs the data in a predetermined format to the recording/playback unit 105. The recording/playback unit 105 generates a video file by adding additional information such as a header set for each file format to the data string output from the recording processing block 130, and records the file on the HDD 106.

In the recording processing block 130, the video signal processor 131 receives the video data input from the camera signal processor 142. The video signal processor 131 performs processing necessary for encoding in a predetermined encoding format, for example, sub-sampling, for the video data from the camera signal processor 142, and outputs the resultant data to the video data encoder 133.

The video data encoder 133 encodes the video data from the video signal processor 131 in accordance with the predetermined encoding format, for example, MPEG2 format or Motion JPEG format, and outputs the encoded data to the data encoding processor 136. The video data encoder 133 also generates a thumbnail image as a representative image of one video file, and outputs the data of the thumbnail image to the data encoding processor 136.

The audio signal processor 132 receives audio data from the microphone 102. The audio signal processor 132 converts an audio signal from the microphone 102 into digital data. The audio signal processor 132 further performs noise reduction, amplification, and the like for the audio data, and outputs the resultant data to the audio data encoder 134. The audio data encoder 134 encodes the audio data from the audio signal processor 132 in a predetermined encoding format, for example, MPEG2 format, and outputs the encoded data to the data encoding processor 136.

The metadata generator 135 generates metadata representing the image capturing date and time, aperture value (F-number), and the like, and outputs the data to the data encoding processor 136. The data encoding processor 136 converts the encoded video data from the video data encoder 133 and the encoded audio data from the audio data encoder 134 into an MPEG2 or JPEG transport stream (TS). The data encoding processor 136 also stores the metadata output from the metadata generator 135 and the thumbnail image from the video data encoder 133, as additional information of the image file, in the header of footer of the data file in the TS format. The data encoding processor 136 outputs the file converted into the TS format to the recording/playback unit 105.

The digital video camera 100 of this embodiment records the video data and audio signals input from the camera block 140 and the microphone 102 together as one file in the interval between the instant an instruction to start recording is input and the instant an instruction to stop recording is input. The user issues an instruction to start recording by pressing the start/stop button, and issues an instruction to stop recording by pressing the start/stop button again. When the user stops recording, the data encoding processor 136 stores metadata from the metadata generator 135 and a thumbnail image from the video data encoder 133 in the header or footer of each file. The header also records a file name and the like.

(Playback Mode)

The operation in the playback mode will be described next. When the user presses the playback button upon selecting the playback mode with the operation mode switch of the operation unit 103, the system controller 104 detects this. The system controller 104 then controls the playback processing block 120 to read out the thumbnail image stored in the header or footer of each video file recorded on the HDD 106 and displays a list of thumbnails on the liquid crystal panel 107 as an example of a display device.

The user checks the thumbnail images displayed on the liquid crystal panel 107, and selects the thumbnail image of a file which he/she wants to play back, by operating, for example, the up, down, left, and right keys included in the operation unit 103. The user then presses the decision button or the like to designate the video file to be played back. When the user designates the video file to be played back, the system controller 104 controls the respective units of the playback processing block 120 to decode the designated video file and display the resultant image on the liquid crystal panel 107.

The playback processing block 120 acquires the designated video file from the HDD 106 via the recording/playback unit 105. The playback processing block 120 then decodes the video data and audio data in the video file, and outputs the resultant data to the video output terminal 108 and the audio output terminal 109, respectively, thereby displaying the played back video on the liquid crystal panel 107 and outputting the sound from the speaker 112. More specifically, when the user designates a video file to be played back, the system controller 104 controls the recording/playback unit 105 to read out the designated video file from the HDD 106 and supplies the file to the playback processing block 120. The video file read out from the HDD 106 by the recording/playback unit 105 is output to the data decoding processor 125. The data decoding processor 125 detects video data and audio data from the supplied video file, and further detects metadata from the header or footer of the video file. The video data is output to the video data decoder 123. The audio data is output to the audio data decoder 124.

The video data decoder 123 decodes the video data output from the data decoding processor 125, and outputs the data to the video output unit 121. The video output unit 121 converts the decoded video data into a format suitable for processing by an external monitor or another external device, and outputs the resultant data to at least one of the video output terminal 108 and the liquid crystal panel 107.

The audio data decoder 124 decodes the audio data output from the data decoding processor 125 and outputs the data to the audio output unit 122. The audio output unit 122 converts the decoded audio signal into a format suitable for processing by an external device, and outputs the resultant data to the audio output terminal 109. Note that it is possible to output the audio signal to the speaker 112.

(Data Transfer Processing)

Upon detecting the connection between the digital video camera 100 and the peripheral device host, the external I/F controller 111 discriminates the type of connected peripheral device host. Thereafter, the external I/F controller 111 notifies the system controller 104 of the connection to the peripheral device host, together with the information of the discriminated type. Upon receiving a data transfer request from the peripheral device host via the external I/F controller 111, the system controller 104 reads out a desired video file from the HDD 106 via the recording/playback unit 105, and transfers the file to the peripheral device host.

Assume that the user can select one of the two operation methods, namely "keep pressing" and "ON/OFF switching", as an operation method for the active image stabilization button. Operation to be performed when the user presses the button for a short period of time in spite of the selection of "keep pressing" will be described with reference to FIGS. 2 to 4. Assume that in this embodiment, it is possible to set, in advance, one of the operation methods, namely "keep pressing" and "ON/OFF switching", concerning the active image stabilization button 501 (FIG. 5) as an operation member based on user operation. "Keep pressing" is a setting to make the active image stabilization function operate in the interval between the instant the user starts pressing the active image stabilization button 501 and the instant the user releases the button. That is, the active image stabilization function is ON only while the user presses the active image stabilization button 501, and is turned off when the user releases the active image stabilization button 501. In contrast, "ON/OFF switching" is a setting to switch the active image stabilization function to the ON state when the user presses the active image stabilization button 501 and the function has been OFF, and to switch the function to the OFF state when the user presses the button and the function has been ON. That is, in "ON/OFF switching", when the active image stabilization function has been OFF, pressing the active image stabilization button 501 will turn on the active image stabilization function. In this case, the active image stabilization function is kept on after the user releases the active image stabilization button 501.

The reason why the user is allowed to select one of the two operation methods, namely "keep pressing" and "ON/OFF switching", for the active image stabilization button will be described below. Turning on the active image stabilization function will change normal image stabilization and stabilization characteristics. This has the merit of enhancing the image stabilization effect on the telephoto side. In contrast to this, the demerit is that it is difficult to follow up panning operation. Allowing the user to select one of the above operation methods in accordance with an image capturing state and the skill of the operator makes it possible to provide a camera with better operability.

Figure 2:
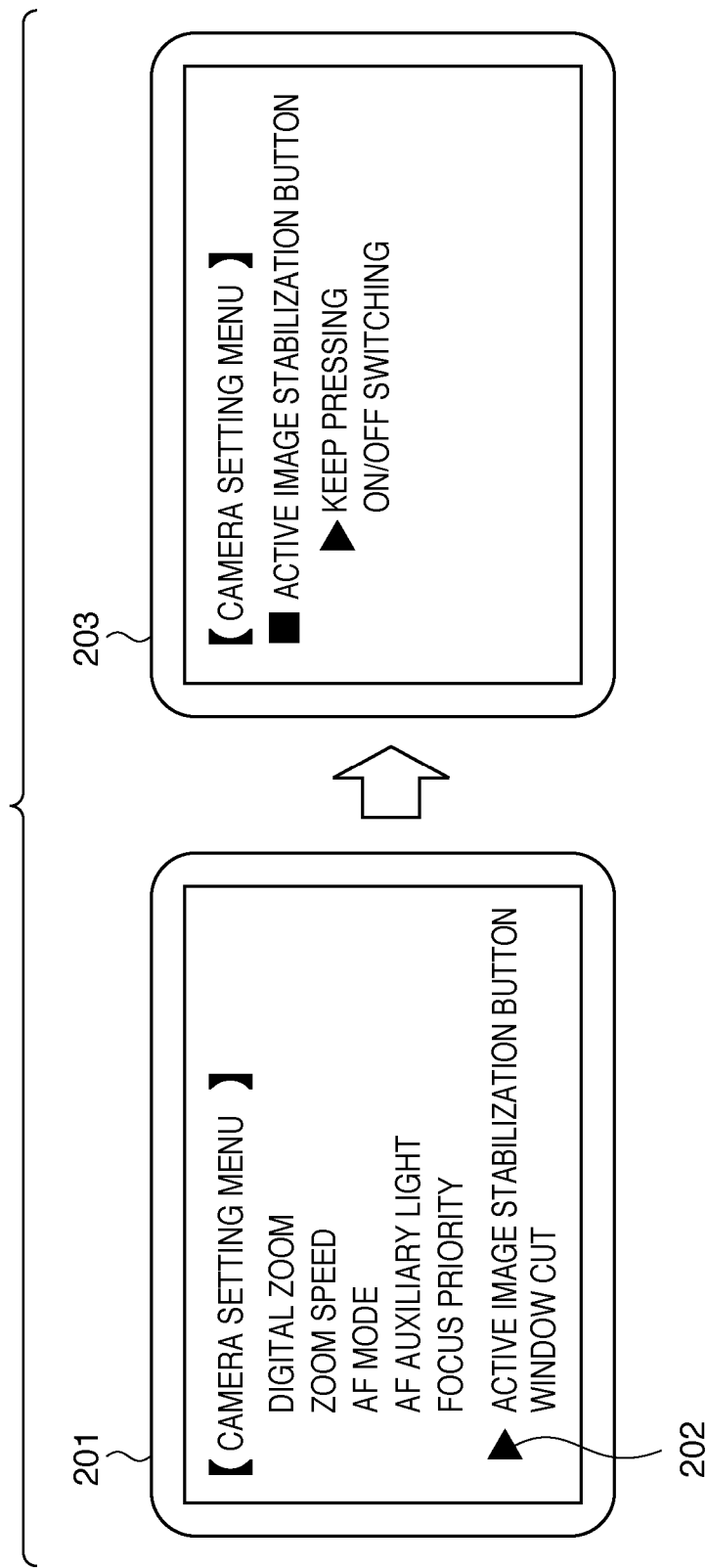
FIG. 2 is a view showing examples of the menus displayed on the digital video camera according to the embodiment.

FIG. 2 shows a display example of a menu screen to switch between "keep pressing" and "ON/OFF switching". In this embodiment, "keep pressing" is the first operation mode of executing the active image stabilization processing only in the interval between the instant the user starts operating (more specifically, pressing) the active image stabilization button and the instant the user stops operating the button. On the other hand, "ON/OFF switching" is the second operation mode of switching between execution and termination of active image stabilization processing every time the user performs one operation (more specifically, pressing) for the active image stabilization button.

When the user presses the menu button of the operation unit 103, a menu 201 is displayed on the liquid crystal panel 107. When the user further moves a menu cursor 202 up and down with the up and down buttons of the operation unit 103, selects "active image stabilization button", and presses the decision button of the operation unit 103, a setting screen 203 is displayed. In this state, the user can select "keep pressing" or "ON/OFF switching" by moving the menu cursor 202 up and down with the up and down buttons of the operation unit 103. In this case, the menu operation with the buttons has been exemplified. It is however, possible to use a touch panel or the like.

Figure 3A:
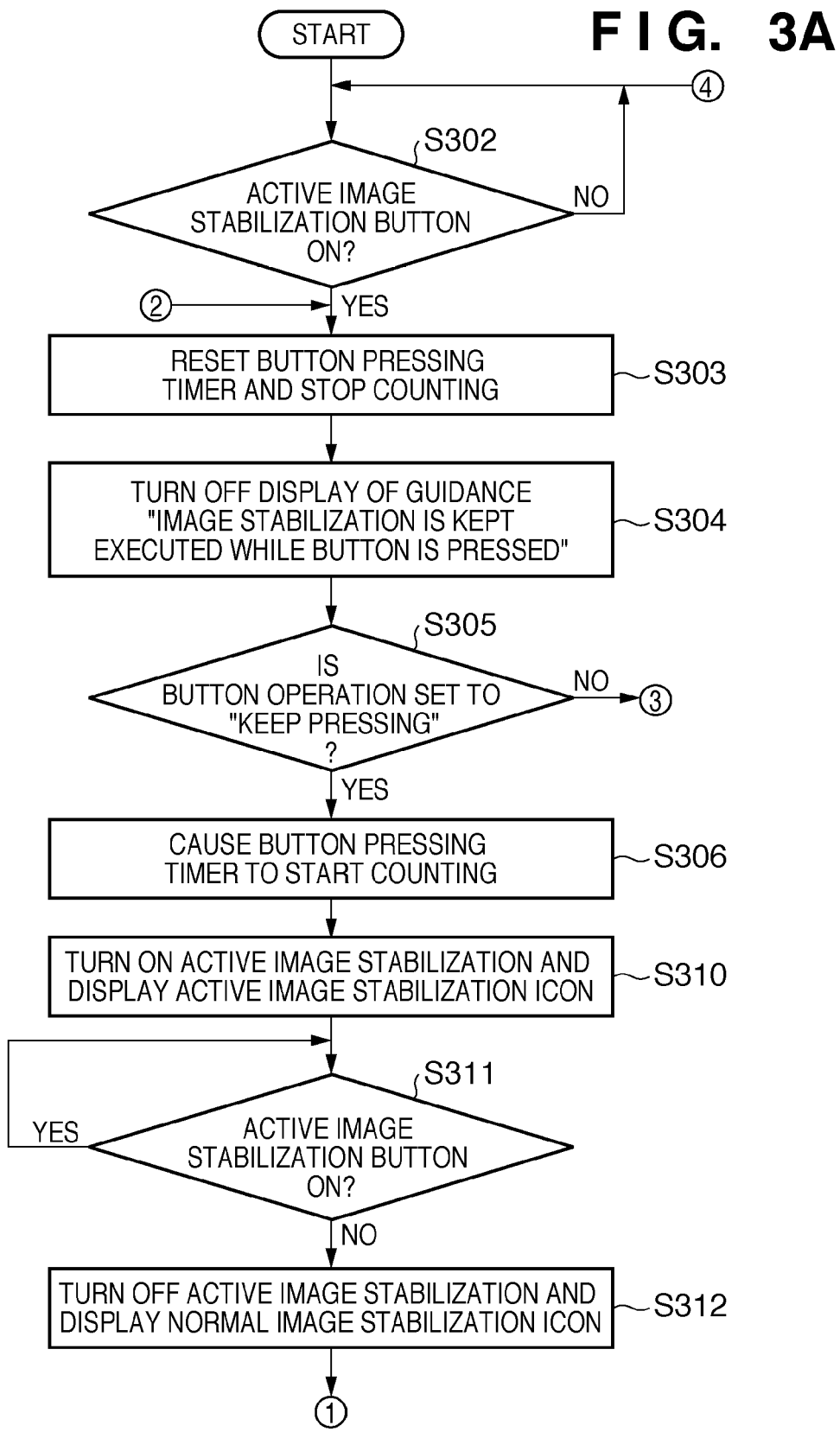
FIGS. 3A to 3B are flowcharts showing the operation of the digital video camera according to the embodiment.
Figure 3B:
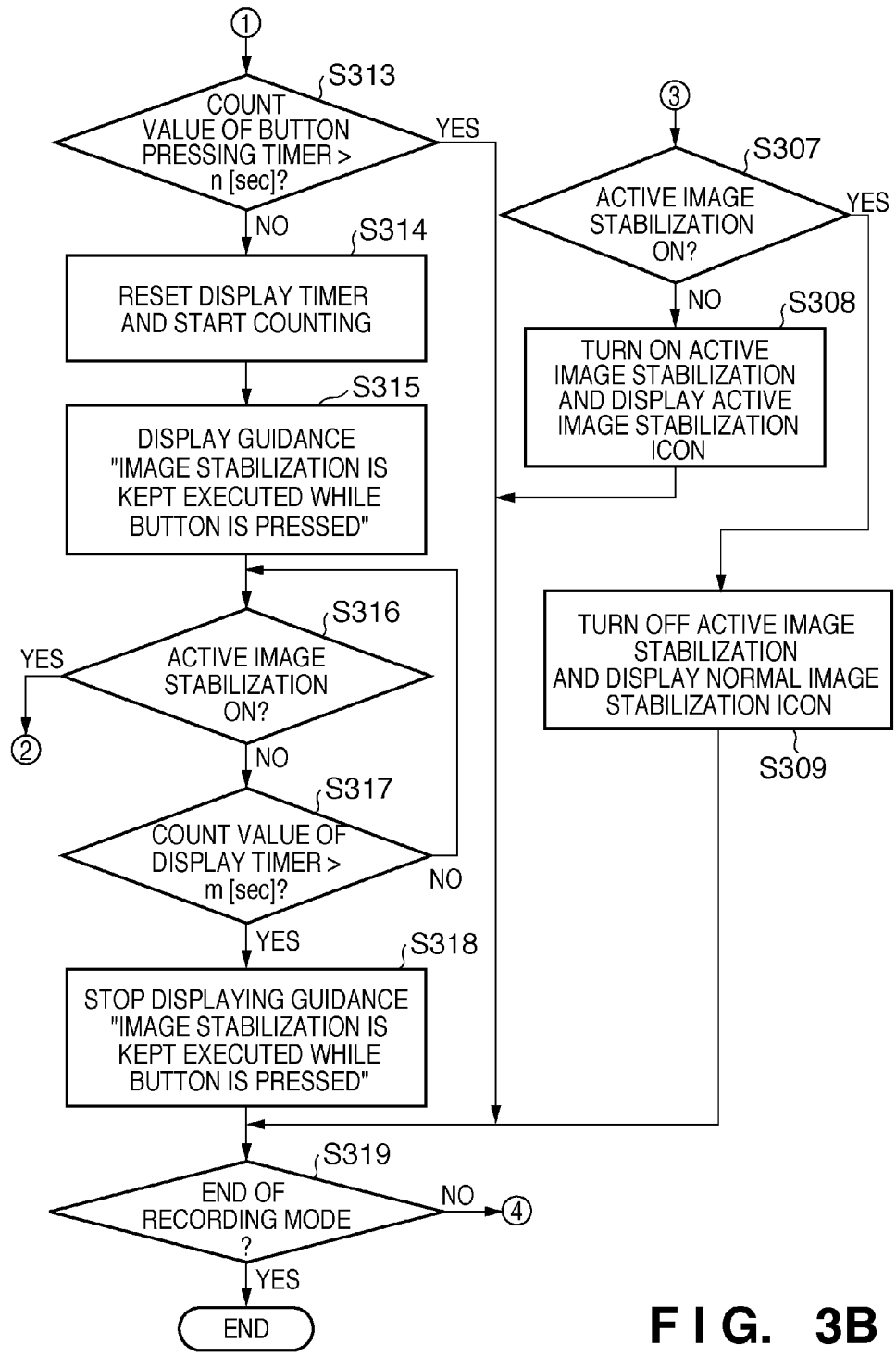
Figure 4:
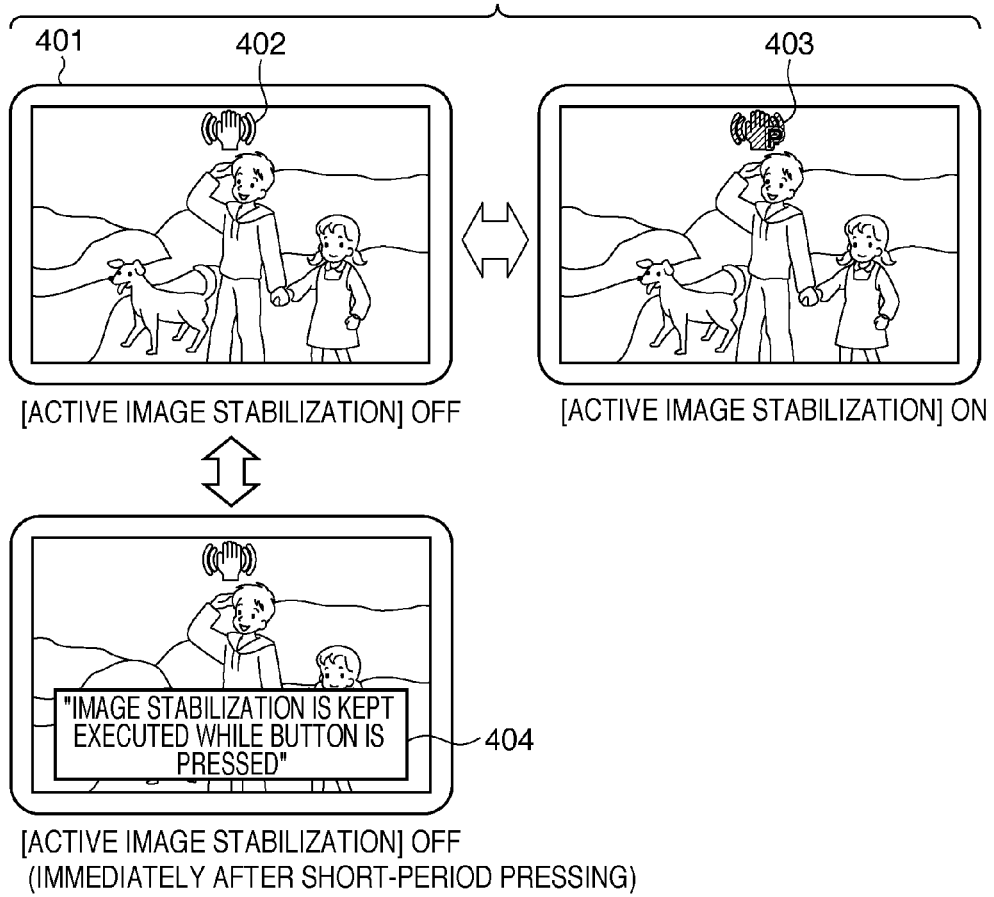
FIG. 4 is a view showing display examples on the liquid crystal panel of the digital video camera according to the embodiment.

FIGS. 3A to 3B are flowcharts showing a processing procedure for ON/OFF switching control on the active image stabilization function. The digital video camera 100 executes this processing when the above recording mode is set. The recording mode includes a standby period for recording (standby period for image capturing) before the issuance of an instruction to start recording with the start/stop button and a recording period (image capturing period) after the start of recording with the start/stop button. Assume that in either period, the object video captured by the camera block 140 is displayed on the liquid crystal panel 107 in real time. The CPU 1041 implements this processing by executing the control program 1045 stored in the ROM 1042 upon expanding the program in the RAM 1043.

When the user switches the digital video camera 100 to the recording mode by operating the operation mode switch included in the operation unit 103, the CPU 1041 starts processing following the flowcharts of FIGS. 3A to 3B. The CPU 1041 performs control so as to execute active image stabilization processing in response to the start of operation of the active image stabilization button as an operation member and terminate the execution of the active image stabilization processing in response to the end of operation of the active image stabilization button. The following is a concrete example of the processing.

In step S302, the CPU 1041 determines whether the user has pressed the active image stabilization button of the operation unit 103. If YES in step S302, the process advances to step S303. If NO in step S302, the process returns to step S302 to wait for the press of the button. In step S303, the timer function unit 1044 of the system controller 104 resets the button pressing timer and stops counting. In step S304, the CPU 1041 turns off the display of the guidance "image stabilization is kept executed while button is pressed". In step S305, the CPU 1041 determines on the menu whether the button operation is set to "keep pressing". If the button operation is set to "keep pressing", the process advances to step S306. If the button operation is not set to "keep pressing", that is, if the button operation is set to "ON/OFF switching", the process advances to step S307.

In step S307, the CPU 1041 determines whether active image stabilization is currently ON or OFF. If active image stabilization is OFF, the process advances to step S308. If active image stabilization is ON, the process advances to step S309. In step S308, the CPU 1041 sets active image stabilization ON and displays an active image stabilization icon (403 in FIG. 4) on the liquid crystal panel 107. In step S309, the CPU 1041 sets active image stabilization OFF and displays a normal image stabilization icon (402 in FIG. 4) on the liquid crystal panel 107. In this case, normal image stabilization and active image stabilization are discriminated by the icons having different designs and colors. However, the form of discrimination or the like is not limited to this as long as the ON state of active image stabilization can be discriminated.

In step S306, the timer function unit 1044 causes the button pressing timer to start counting. In step S310, the CPU 1041 sets active image stabilization ON and displays the active image stabilization icon (403 in FIG. 4) on the liquid crystal panel 107. In step S311, the CPU 1041 determines whether the active image stabilization button of the operation unit 103 is pressed. If NO in step S311, the process advances to step S312. If YES in step S311, the process returns to step S311 to wait for the release of the button.

In step S312, the CPU 1041 sets active image stabilization OFF and displays the normal image stabilization icon (402 in FIG. 4) on the liquid crystal panel 107. In step S313, the CPU 1041 determines whether the count value of the button pressing timer is larger than preset n [sec] (about several hundred msec). If YES in step S313, the process advances to step S319 to terminate the processing. If NO in step S313, the process advances to step S314.

In step S314, the CPU 1041 starts counting after resetting the display timer of the timer function unit 1044 of the system controller 104. In step S315, the CPU 1041 displays the warning or guidance "image stabilization is kept executed while button is pressed" (404 in FIG. 4) on the liquid crystal panel 107. In step S316, the CPU 1041 determines whether the active image stabilization button of the operation unit 103 is pressed. If YES in step S316, the process returns to step S303. If NO in step S316, the process advances to step S317. In step S317, the CPU 1041 determines whether the count value of the display timer is larger than preset m [sec]. If YES in step S317, the process advances to step S318. If NO in step S317, the process returns to step S316. In step S318, the CPU 1041 terminates the display of the guidance "image stabilization is kept executed while button is pressed" (401 in FIG. 4) on the liquid crystal panel 107.

As described above, the first embodiment includes the button which can be switched between the button for ON/OFF switching operation and the button for making the function effective during pressing. When the user presses the button for a short period of time, forgetting that he/she has set this button to the button for making the function effective during pressing, the following effects can be obtained. Even if the user cannot obtain a desired operation result due to the above operation, this apparatus quickly notifies the user of the reason. This can guide the user to a proper operation method from the next time, thus allowing the user to obtain a desired operation result. In addition, while the function is executed, the apparatus displays information letting the user know that the function is being executed. The user can therefore reliably know that the button is actually pressed, and the desired function is executed.

Figure 5:
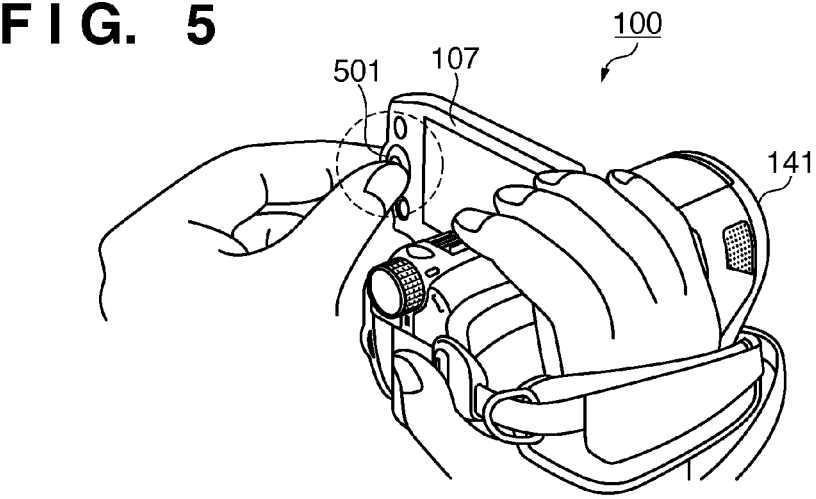
FIG. 5 is a perspective view showing an example of the button placement on the video camera according to the embodiment.

Note that the active image stabilization button 501 is placed at a position in consideration of the characteristics of the function. FIG. 5 shows a case in which the active image stabilization button 501 is placed on the liquid crystal panel 107 of the digital video camera 100. Assume that the active image stabilization button 501 is placed at this position, and the user sets the button so as to make the active image stabilization function effective by "keep pressing". In this case, as shown in FIG. 5, the user holds the camera body with his/her right hand, while holding the active image stabilization button 501 placed on the liquid crystal panel 107 with his/her left hand. That is, in this case, the active image stabilization button 501 is placed at a position which faces the portion held with one hand through the image sensing unit 141 and at which the button is held with other hand. This can enhance the image stabilization function and induce the user to hold the digital video camera 100 with his/her both hands in a stable posture, thereby more actively preventing camera shake. In this embodiment, as described above, the active image stabilization button 501 is placed at the position shown in FIG. 5 to produce a synergistic effect based on the active image stabilization function of the video camera and firm holding of the video camera.

<Second Embodiment>

The second embodiment will exemplify a case in which the concept of control described in the first embodiment is applied to other than the active image stabilization button. The same reference numerals denote functional blocks which perform the same processes as those in the first embodiment, and a description of them will be omitted.

Figure 6:
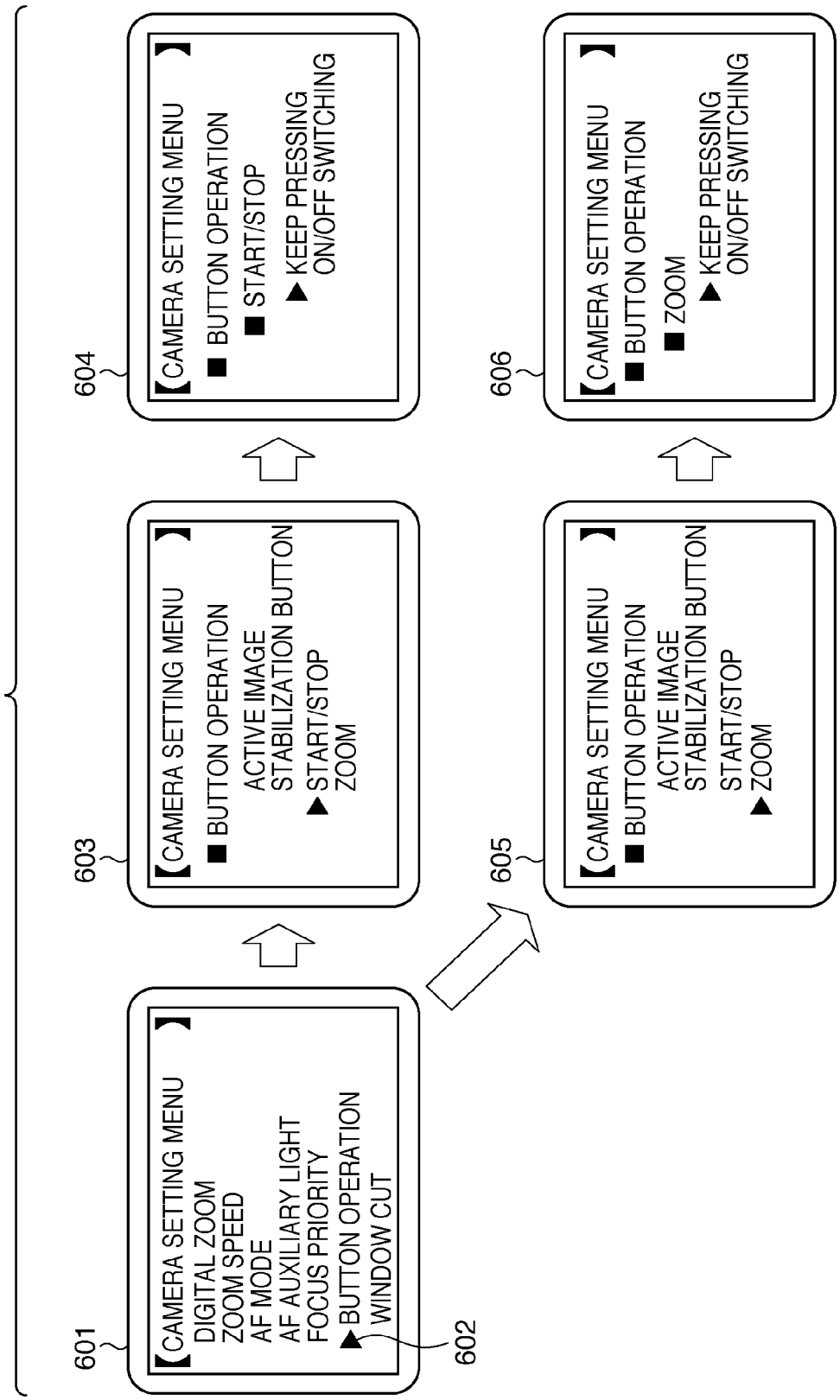
FIG. 6 is a view showing examples of the menus displayed on a digital video camera according to an embodiment.

FIG. 6 shows an example of menu display performed by a digital video camera 100 in this embodiment. When the user presses the menu button of an operation unit 103, a liquid crystal panel 107 displays a menu 601. When the user further selects "button operation" by vertically moving a menu cursor 602 with the up and down buttons of the operation unit 103 and presses the decision button of the operation unit 103, a setting screen 603 is displayed. In this state, the user selects a desired button by vertically moving a menu cursor 602 with the up and down buttons of the operation unit 103. The setting screen 603 indicates a case in which "start/stop" is selected. A setting screen 605 indicates a case in which "zoom" is selected. In this case, the user can select "keep pressing" or "ON/OFF switching" by pressing the decision button of the operation unit 103. A setting screen 604 indicates a case in which the user has selected "start/stop" on the setting screen 603. A setting screen 606 indicates a case in which the user has selected "zoom" on the setting screen 605. Note that in this case, the menu operation with the buttons has been exemplified. It is however, possible to use a touch panel or the like.

Figure 7:
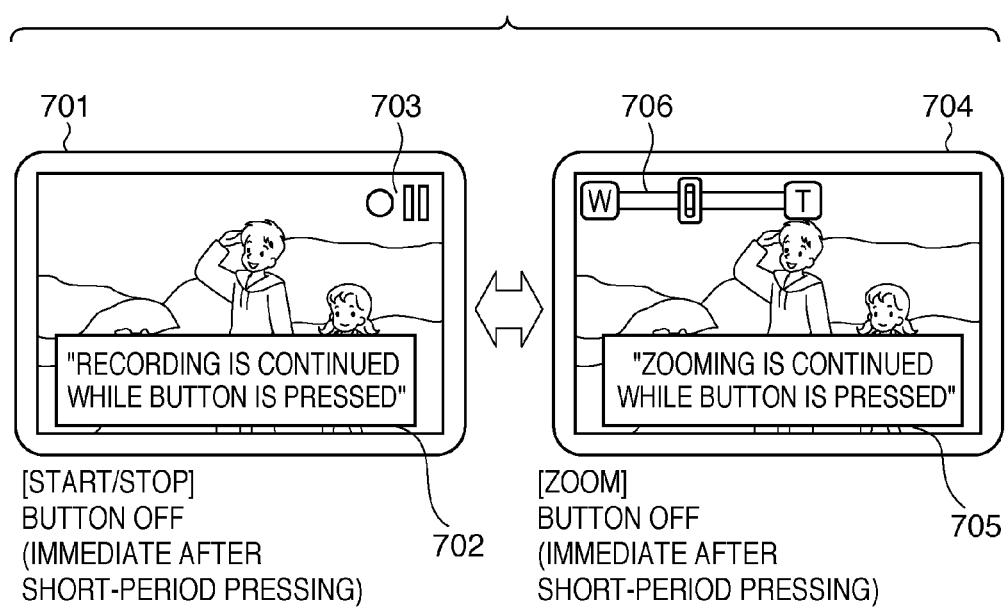
FIG. 7 is a view showing display examples on the liquid crystal panel of the digital video camera according to the embodiment.

FIG. 7 shows display examples on the liquid crystal panel according to the embodiment. When the user presses the start/stop button of the operation unit 103 for a short period of time while "keep pressing" of "start/stop" is selected on the setting screen 604 in FIG. 6, for example, a guidance 702 "recording is continued while button is pressed" is displayed on a recording screen 701 for a predetermined period of time. Reference numeral 703 denotes an example of display indicating a recording pause state.

When the user presses the zoom button of the operation unit 103 for a short period of time on the setting screen 606 in FIG. 6 while "keep pressing" of "zoom" is selected, a guidance 705 "zooming is continued while button is pressed" is displayed on a recording screen 704 for a predetermined period of time. Reference numeral 706 denotes an example of display indicating a state in which zooming operation is not currently performed.

As described above, according to the second embodiment, the camera including a plurality of buttons as operation members and having predetermined functions assigned to the respective buttons can switch operation methods for each button in accordance with designation by the user. In addition, a guidance corresponding to the operation method assigned to each button is displayed. This allows the user to perform operation without any confusion concerning a plurality of operation methods assigned to the respective buttons.

Each embodiment described above has exemplified the case in which when a button to which the function which is made effective only during the pressing of the button is assigned is operated for only a period of time equal to or less than a predetermined time, a guidance concerning the operation method assigned to the button is displayed as a warning. However, it is possible to output a warning other than a guidance displayed as a warning. That is, when a button to which the function which is made effective only during the pressing of the button is assigned is operated for only a period of time equal to or less than a predetermined time, it is possible to generate a warning sound instead of displaying a warning or together with a warning indication.

The present invention has been described in detail above based on the preferred embodiments. However, the present invention is not limited to these specific embodiments, and includes various forms without departing from the scope of the invention. The above embodiments may be partly combined with each other.

The above embodiments have exemplified the digital video camera. However, it is possible to find the same effects as those described above in various apparatuses including buttons which are made effective while kept pressed.

Note that control by the system controller 104 may be implemented by one piece of hardware, and the overall apparatus may be controlled by sharing processes among a plurality of pieces of hardware.

The present invention has been described in detail based on the preferred embodiments. However, the present invention is not limited to these specific embodiments, and includes various forms without departing from the scope of the invention. The above embodiments are merely examples of the present invention, and the respective embodiments can be combined as needed.

In addition, the above embodiments have exemplified the case in which the present invention is applied to the digital video camera. However, the present invention is not limited to this. That is, the present invention can be equally applied to a personal computer, a PDA, a portable image viewer such as a cellular phone terminal, a display provided for a printer apparatus to select and check printed images, a digital photo frame, and the like.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-288419, filed Dec. 18, 2009, which is hereby incorporated by reference herein in its entirety.

What is claimed is:

1. An information processing apparatus comprising:
a control unit configured to perform control to execute a predetermined function
in response to a start of a single operation on an operation member and terminate execution of the predetermined function in response to an end of the single operation which has continued from the start of the single operation;
a time measuring unit configured to measure a time from the start of the single operation on the operation member; and
an output unit configured to output a notification about an operation method for the operation member in response that the single operation which has continued from the start of the single operation ends before the time measured by said time measuring unit exceeds a predetermined time after the single operation starts and the execution of the predetermined function starts in response the start of the single operation, wherein the notification is not output prior to the ending of the single operation; and
wherein the predetermined function includes an active image stabilization function of making an image stabilization effect stronger when turned ON, compared to being in the OFF state.

2. The apparatus according to claim 1, further comprising a display unit configured to display that the predetermined function is being executed, during execution of the predetermined function.

3. The apparatus according to claim 1, further comprising a selection unit configured to select, in accordance with an instruction from a user, a first operation mode of executing the predetermined function only in an interval between a start of operation on the operation member and an end of the operation and a second operation mode of switching between execution and termination of the predetermined function for every operation on the operation member,
wherein when said selection unit selects the first operation mode, said control unit, said time measuring unit, and said output unit operate.

4. The apparatus according to claim 1, wherein the operation member comprises a plurality of operation members, the predetermined function includes a plurality of functions respectively corresponding to the plurality of operation members, and said output unit outputs a notification corresponding to a function executed by one of the plurality of operation members which is operated.

5. The apparatus according to claim 1, wherein the operation member is placed at an opposite side position of a portion held with one hand of a user through an image sensing unit and at which the operation member is held with the other hand.

6. The apparatus according to claim 5, further comprising a camera body including the image sensing unit, and a variable-angle display unit with which the angle can be freely changed with respect to the camera body,
wherein the portion held with one hand of a user is provided on the camera body, and the opposite side position at which the operation member is placed is provided on the variable-angle display unit.

7. A non-transitory computer-readable storage medium storing a program for causing a computer to function as each unit of an information processing apparatus defined in claim 1.

8. The apparatus according to claim 1, wherein said output unit is configured not to output the notification when the operation ends after the time measured by said time measuring unit exceeds a predetermined time after the operation starts.

9. The apparatus according to claim 1, wherein said output unit is configured to output the notification to a display unit to display the notification.

10. The apparatus according to claim 9, wherein said output unit is configured to output a message as the notification, which indicates that the predetermined function is kept executed while the operation member being operated, to said display unit, when the operation ends before the time measured by said time measuring unit exceeds the predetermined time after the operation starts.

11. The apparatus according to claim 9, wherein said output unit is configured to end the displaying of the notification upon elapse of a predefined time period after the notification is displayed.

12. The apparatus according to claim 11, wherein said output unit is configured to end the displaying of the notification in response to the start of operation on the operation member, even before the predefined time period elapses after the notification is displayed.

13. The apparatus according to claim 1, wherein said control unit
performs control to execute the predetermined function when the time measured by said measuring unit does not exceed the predetermined time, as well as when the single operation is still continued after the time measured by said measuring unit exceeds the predetermined time.

14. A method of controlling an information processing apparatus, comprising the steps of:
performing control to execute a predetermined function in response to a start of a single operation on an operation member and terminate execution of the predetermined function in response to an end of the single operation which has continued from the start of the single operation;
measuring a time from start of the single operation on the operation member; and
outputting a notification about an operation method for the operation member in response that the single operation which has continued from the start of the single operation ends before the time measured in the time measuring step exceeds a predetermined time after the single operation starts and the execution of the predetermined function starts in response the start of the single operation, wherein the notification is not output prior to the ending of the single operation; and
wherein the predetermined function includes an active image stabilization function of making an image stabilization effect stronger when turned ON, compared to being in the OFF state.

15. A camera comprising:
a control unit configured to perform control to execute a predetermined function in response to a start of an operation on an operation member and terminate execution of the predetermined function in response to an end of the operation;
a time measuring unit configured to measure a time from the start of the operation on the operation member; and
an output unit configured to output a notification about an operation method for the operation member when the operation ends before the time measured by said time measuring unit exceeds a predetermined time after the operation starts,
wherein the predetermined function includes an active image stabilization function of making an image stabilization effect stronger when turned ON, compared to being in the OFF state.

16. A non-transitory computer-readable storage medium storing a program for causing a computer to function as each unit of a camera defined in claim 15.

17. A method of controlling a camera comprising:
controlling to perform control to execute a predetermined function in response to a start of an operation on an operation member and terminate execution of the predetermined function in response to an end of the operation;
measuring a time from the start of the operation on the operation member; and
outputting a notification about an operation method for the operation member when the operation ends before the time measured by said measuring exceeds a predetermined time after the operation starts,
wherein the predetermined function includes an active image stabilization function of making an image stabilization effect stronger when turned ON, compared to being in the OFF state.

* * * * *